United States Patent [19]
Fenouil

[11] Patent Number: 5,537,142
[45] Date of Patent: Jul. 16, 1996

[54] LOCAL AREA NETWORK FOR SIMULTANEOUS, BI-DIRECTIONAL TRANSMISSION OF VIDEO BANDWIDTH SIGNALS, INCLUDING A SWITCHING MATRIX WHICH DEFINES USER CONNECTIONS, UPSTREAM CONNECTIONS, AND DOWNSTREAM CONNECTIONS

[75] Inventor: Remy L. Fenouil, Louisville, Ky.

[73] Assignee: VideoLan Technologies, Inc., Lima, Ohio

[21] Appl. No.: 140,230

[22] Filed: Oct. 20, 1993

[51] Int. Cl.$^6$ .................................................. H04N 5/268
[52] U.S. Cl. ............................. 348/12; 348/16; 348/705
[58] Field of Search ................................. 348/12, 13, 16, 348/705, 706; 370/57, 71, 73, 24; 340/825.85, 825.79, 825.83, 825.8, 825.89; H04N 5/268

[56] References Cited

U.S. PATENT DOCUMENTS

| | | |
|---|---|---|
| 4,292,475 | 9/1981 | Hill et al. . |
| 4,628,437 | 12/1986 | Poschmann et al. . |
| 4,640,989 | 2/1987 | Riner et al. . |
| 4,652,873 | 3/1987 | Dolsen et al. . |
| 4,682,349 | 7/1987 | Sorrioux ........................................ 348/16 |
| 4,686,698 | 8/1987 | Tompkins et al. . |
| 4,726,054 | 2/1988 | Molnar . |
| 4,740,956 | 4/1988 | Hailpern et al. . |
| 4,742,515 | 5/1988 | Dabholkar et al. . |
| 4,744,078 | 5/1988 | Kowalczyk . |
| 4,766,589 | 5/1988 | Fisher . |
| 4,792,941 | 12/1988 | Yanosy, Jr. et al. . |
| 4,885,569 | 12/1989 | Lellouche . |
| 4,918,516 | 4/1990 | Freeman . |
| 4,949,170 | 8/1990 | Yanagidaira et al. . |
| 4,955,048 | 9/1990 | Iwamura et al. . |
| 4,977,449 | 12/1990 | Morgan . |
| 5,042,062 | 8/1981 | Lee et al. ........................................ 348/16 |
| 5,107,256 | 4/1992 | Ueno et al. . |
| 5,200,989 | 4/1993 | Milone ........................................ 348/16 |
| 5,365,264 | 11/1994 | Inoue et al. ................................ 348/12 |

FOREIGN PATENT DOCUMENTS

| | | |
|---|---|---|
| 0386981 | 9/1990 | European Pat. Off. . |
| 2743765 | 9/1977 | Germany . |
| 0135133 | 6/1991 | Japan ........................................ 370/53 |
| 2094592 | 6/1981 | United Kingdom . |

OTHER PUBLICATIONS

Ronald P. Bianchini Jr. & Hyong S. Kim, *Design of a Nonblocking Shaped–Memory Copy Network for ATM*, IEEE Infocom '92.

Tak–Shing P. Yum *Hierarchical Distribution of Video with Dynamic Port Allocation*, IEEE, Transactions on Communications, vol. 39, No. 8, Aug. 1991.

Nakajima, et al, *Broadband Switching System*, Review of the Electrical Communication Laboratories, vol. 33, No. 4, 1985.

Richard Beckwith, *Live–Net—An Integrated Broadband Video and Data Network*, Computer Communications, vol. 10, No. 5, 1987.

*Primary Examiner*—David E. Harvey
*Attorney, Agent, or Firm*—Wheat, Camoriano, Smith & Beres

[57] ABSTRACT

A local area network for the simultaneous, bi-directional transmission of video bandwidth signals includes an economical switching matrix. The switching matrix defines upstream connections, downstream connections, and user connections and a plurality of switching points in order to provide bi-directional switching capability between every user and every upstream connection, between every user and every downstream connection, and between every user and every other user connected to the matrix, while using fewer than half of the usual N×N number of switching points, where N equals the number of user connections plus the number of upstream connections plus the number of downstream connections.

6 Claims, 9 Drawing Sheets

LOCAL AREA NETWORK FOR SIMULTANEOUS, BI-DIRECTIONAL TRANSMISSION OF VIDEO BANDWIDTH SIGNALS, INCLUDING A SWITCHING MATRIX WHICH DEFINES USER CONNECTIONS, UPSTREAM CONNECTIONS, AND DOWNSTREAM CONNECTIONS

BACKGROUND OF THE INVENTION

The present invention relates to local area networks, and, in particular, to a local area network for the simultaneous, bi-directional transmission of video bandwidth signals.

Local area networks which can transmit video bandwidth signals are known.

Figures 1, 2:
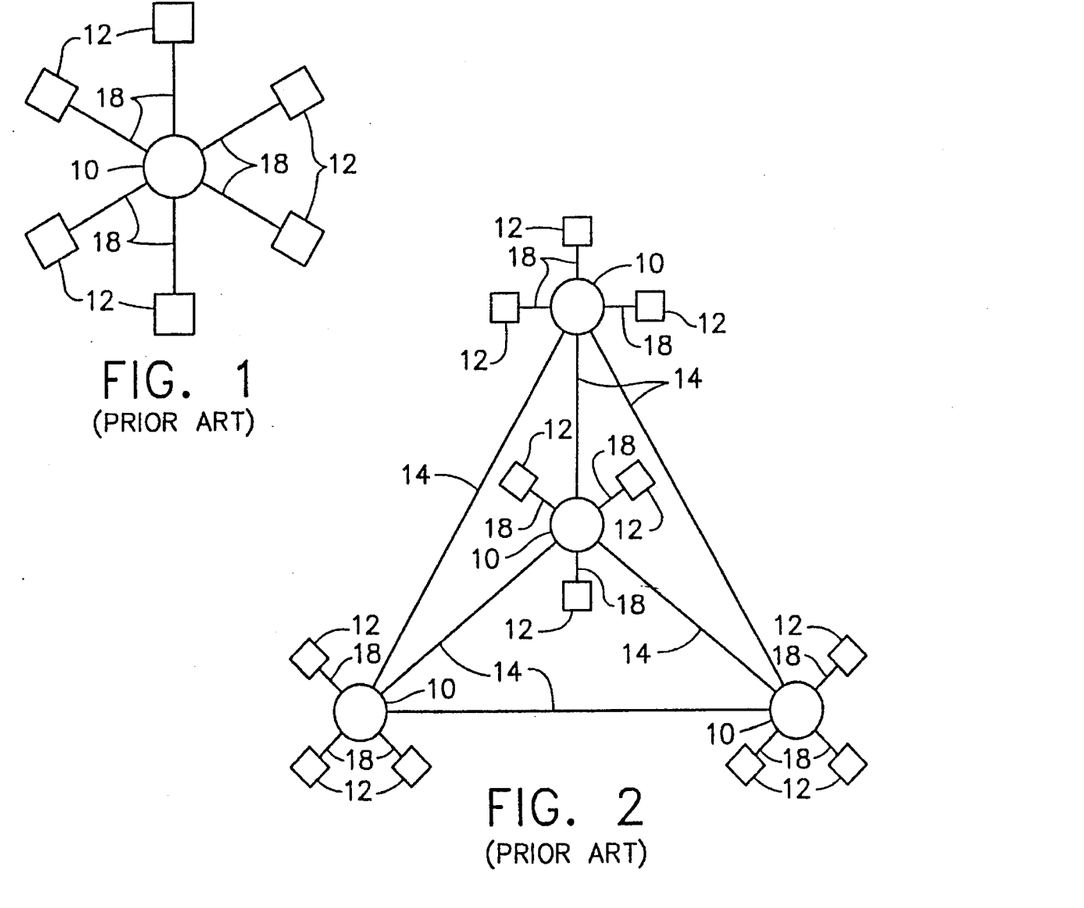
FIG. 1 is a view of a star configuration network, as known in the prior art.
FIG. 2 is a view of another type of prior art network configuration.
Figure 3:
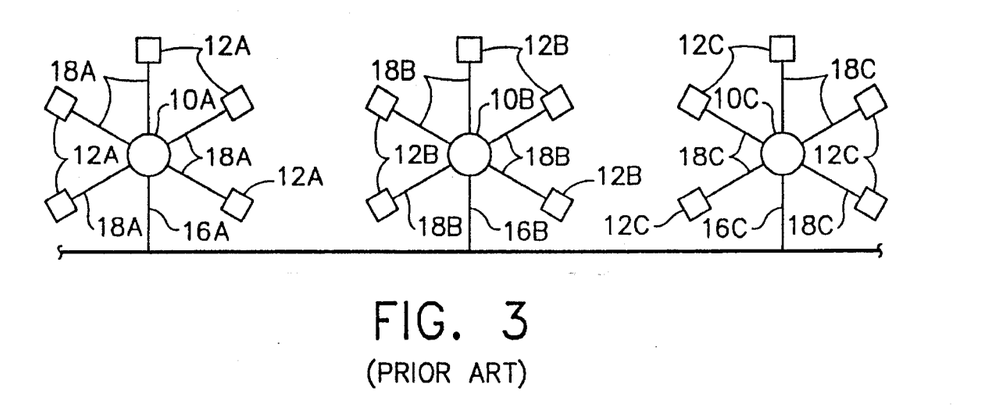
FIG. 3 is a view of a prior art bus network configuration.

FIGS. 1–3 show some prior art networks. In FIG. 1, there is a hub 10, which includes a central processor and an N×N crosspoint switch, with N being the number of users 12 (the number of inputs and the number or outputs) to be connected to the hub 10 by means of paths 18. The N×N crosspoint switch permits all the users 12 on the hub 10 to communicate with each other, but it is limited to N users.

FIG. 2 shows one way in which the arrangement of FIG. 1 can be expanded to include more users. In that arrangement, three users have been removed from each hub 10, and the other user ports have been used to connect to other hubs 10 along the paths 14. In this way, more users can be interconnected, but there is a limit to the number of users that can be connected to this system, because every time a new hub is added, a user has to be subtracted from all the other hubs.

FIG. 3 shows a way in which many hubs 10 can be interconnected by connecting them to a bus 20 along the paths 16. With this arrangement, a user 12A connected to the hub 10A on the left can communicate with a user 12C connected to the hub 10C on the right by transmitting a signal along its respective path 18A to its hub 10A, along the path 16A to the bus 20, where it occupies a channel along the entire bus 20, which can be received by a user 12C by passing along the path 16C to the hub 10C and then to the user 12C. This arrangement is limited in that, once all the channels on the bus 20 are used up, no additional signals can be transmitted from hub to hub. If a video conference is being conducted between a user 12A and a user 12C on channel 1, then users 12F and 12G (off the page to the right) cannot conduct another video conference on channel 1 at the same time.

The arrangement of FIG. 3 is also severely limited in the number of connecting lines 16 between each hub 10 and the bus 20, so that, if there is only one connecting line 16A between the hub 10A and the bus 20, then only one channel of the bus 20 can be used by the users 12A at any one time. This means that, if a user 12A is conducting a video conference with a user 12C on channel 1, then another user 12A cannot watch a video on channel 10 of the bus 20 at the same time. In order to provide more connecting lines to the bus 20, users 12 would have to be removed from the hub 10, which again limits the function of the network.

SUMMARY OF THE INVENTION

The present invention provides a local area network for the simultaneous, bi-directional transmission of video bandwidth signals which is very versatile while also being very cost-effective.

The present invention provides a local area network which can be used for video-conferencing, for remote control and viewing of video tapes or video cameras, and so forth.

The present invention provides a local area network which permits channel segmentation, so that a signal may be stopped at a switching matrix and replaced by another signal which travels on the same channel to the next switching matrix. This permits greater flexibility than does a typical bus, in which the same signal is transmitted to all users on a given channel.

DESCRIPTION OF THE PREFERRED EMBODIMENT

Figure 4:
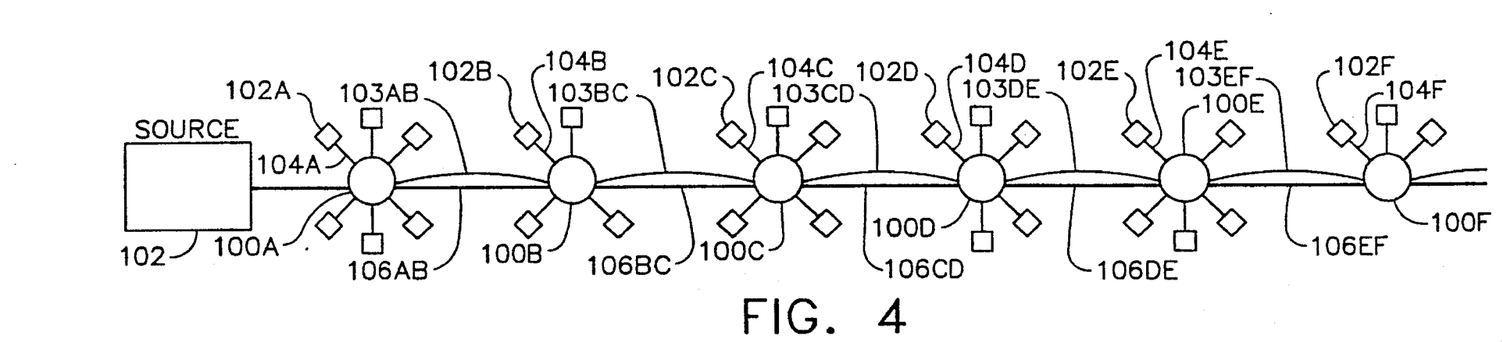
FIG. 4 is a view of a network made in accordance with the present invention.

An example of a network made in accordance with the present invention is shown in FIG. 4. In that arrangement are shown several switching hubs 100 A through F. Each hub or concentrator 100 has several users 102, which are connected to their respective concentrator 100 along paths 104. Each concentrator 100 includes a central processor and a plurality of crosspoint switches interconnected to form a matrix, which will be described in more detail later. In the preferred embodiment, the concentrators 100 also do some treatment of the signals, as will be described later.

The arrangement shown in FIG. 4 has the ability to continue to add more users by adding more concentrators along an internodal pathway 106. The internodal pathway 106 permits the addition of more hubs or concentrators, as does the bus 20 of FIG. 3, but it has the added advantage that, because of the functionality of the switching matrix inside each hub 100, it can segment the channels which are carried by the pathway 106, so that the signal carried on channel 1 along the internodal path 106AB, between the hubs 100A and 100B, may be different from the signal carried on channel 1 along the internodal path 106BC, between the hubs 100B and 100C. This means that each channel can carry a variety of signals along its length, thereby greatly increasing the number of signals that can be carried by a given size of network. The internodal pathway 106 is intended to carry analog signals. In addition to the internodal pathway 106, there is also an internodal digital link 103 between concentrators 100 for carrying digital signals. The purpose of the internodal digital link 103 will be explained in more detail later.

In the prior art network shown in FIG. 2, each connection from one hub to another is the same as a user connection. Thus, if a hub is adapted to be connected to ten other hubs and to six users (sixteen inputs and sixteen outputs), that hub must include a 16×16 crosspoint switch (with 256 switching points).

In the prior art network shown in FIG. 3, if the bus 20 carries 64 channels, each hub 10 has access to all 64 channels, and each hub 10 has the capacity to handle sixteen users, then, according to the teachings of the prior art, the hubs 10 must each have a crosspoint switch of (16+64)×(16+64), (80 inputs by eighty outputs) or a switch having 6400 switch points in it.

The matrix switch in the hub or concentrator 100 of the present invention differs from the prior art in that it defines users, upstream paths, and downstream paths and provides the switching to make those paths function optimally while minimizing the number of switching points. The upstream paths and downstream paths are the internodal paths 106, shown in FIG. 4. For example, for the matrix 100C, the upstream path may be the path 106BC, and the downstream path may be the path 106CD. The users are the users 102C. As shown in this figure, a user 102 includes a user interface and whatever external devices are connected to the user interface, such as a multimedia computer terminal, a video camera, a video recorder, an audio tape recorder, a video monitor, or any other device which originates or receives signals. There may also be a source 120 at the head end of the network or at some internodal path 106 in the network for bringing such things as cable television channels into the network. There are also digital ports on each concentrator 100, permitting the concentrators 100 to be interconnected by the data link 103 in addition to the internodal paths 106.

Figure 5:
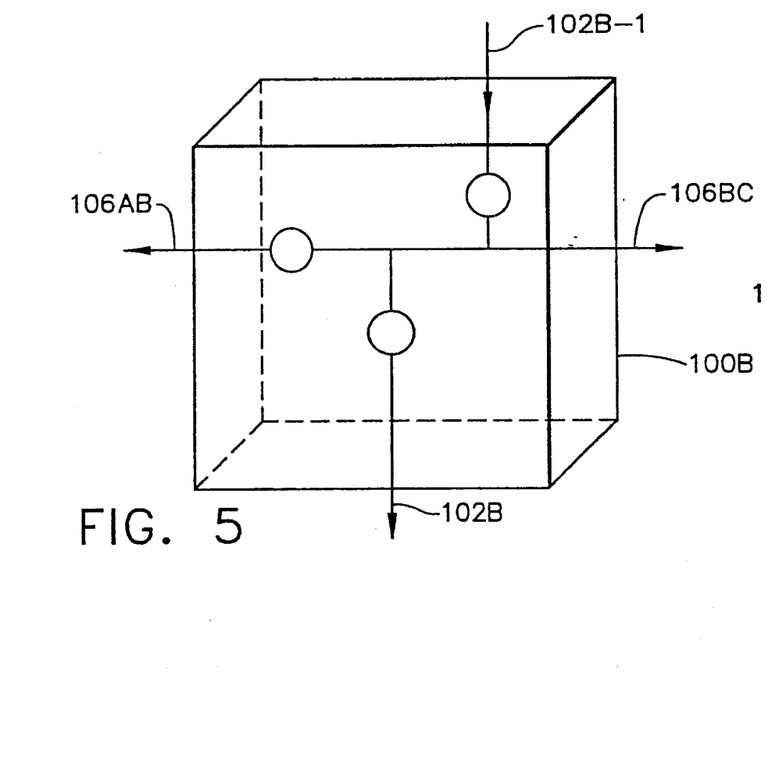
FIG. 5 is a schematic conceptualization of some of the switching capabilities of the network of FIG. 4.
Figure 6:
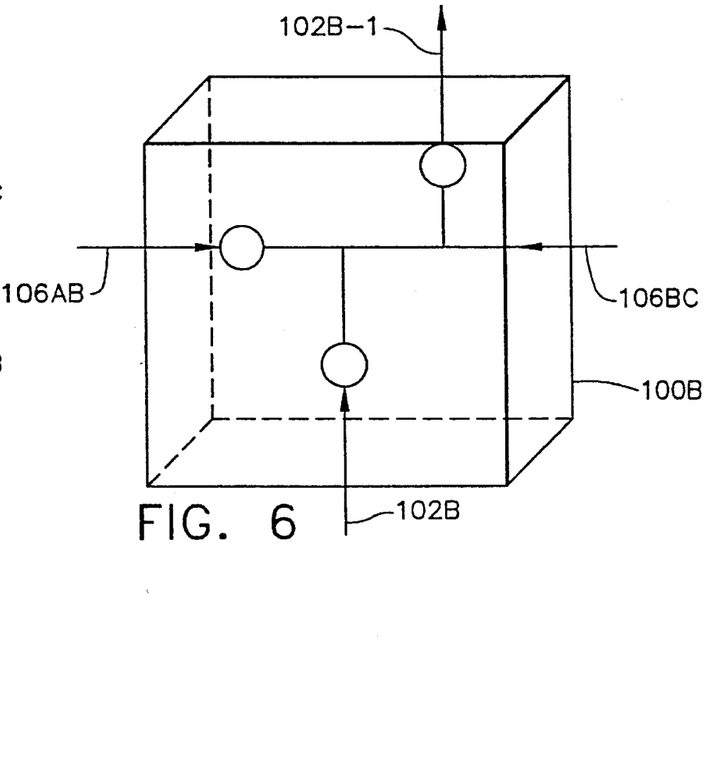
FIG. 6 is a schematic conceptualization showing some of the switching capabilities of the network of FIG. 4.

FIGS. 5 and 6 summarize the switching capabilities of the matrix of switches inside the concentrator 100B. Looking first at FIG. 5, for any given user 102B (let's say user 102B-1) connected directly to the concentrator 100B, when the user 102B-1 is transmitting a signal into the concentrator 100B, the matrix of switches inside the concentrator 100B performs three independent types of switching functions for that signal. It can send the signal to any one or more of the upstream paths 106AB or not send the signal to any of the upstream paths (a first type of switching function). It can send the signal to any one or more of the users 102B connected to the same concentrator 100B or not send the signal to any of the users 102B on the same concentrator (a second type of switching function). Third, it can send the signal to any one or more of the downstream paths 106BC or not send the signal to any of the downstream paths. These three switching functions are independent, so that the user 102B-1 may be doing all three things at the same time—i.e., sending the same signal to other users on the same matrix, sending the signal upstream, and sending the signal downstream. Any of those switching functions can be on or off at any given time for any given user.

FIG. 6 shows when that user 102B-1 is receiving a signal from the matrix 100B. Again, it shows three different switching functions. The user 102B-1 may be receiving a signal from any one of the other users, may receive a signal from any upstream path, or may receive a signal from any downstream path. While these switching functions are also independent, the intelligence of the central processor (CPU) in the concentrator 100B will only allow a single user path to receive a signal from one source at a time to avoid mixing of signals.

The arrangement shown in FIGS. 5 and 6 is true for every user 102B connected to the matrix 100B, so that there are effectively bi-directional on-off switches between every user 102B and every other user 102B, between every user 102B and every upstream path 106AB, and between every user 102B and every downstream path 106BC. The effect of these three different switching functions in a single matrix of switches is channel segmentation. This means that a signal coming into the concentrator 100B from a downstream path can be stopped at the concentrator 100B and replaced by a signal from a user 102B, for example. This is not possible in the prior art bus configuration of FIG. 3. It would be possible in a network such as that shown in FIG. 2, but that network is necessarily severely limited in size due to its structure.

For example, in the present invention, for a user 102A to communicate with a user 102C will tie up one channel along the paths 106AB and 106BC, but that channel will again be open in the other internodal pathways, such as 106CD, 106DE, 106EF, and so forth, so that same channel could also be used by a user 102D to communicate with a user 102F, for example.

In the prior art bus arrangement of FIG. 3, there is no distinction between upstream paths and downstream paths at the hub. With the bus 20, from each hub 10 there is only an upstream path or a downstream path—not both. The switch in the hub 10B in FIG. 3 can send signals to the bus 20 and receive signals from the bus 20. It cannot stop a signal travelling along the bus 20 or replace a signal travelling along the bus 20 with a different signal. The ability to segment channels gives the present invention much greater flexibility for a fixed size of internodal pathway 106 and a fixed size of switching matrix 100.

For example, in one embodiment of the present invention, each concentrator 100 is capable of connecting to 16 different users, to 64 upstream paths, and to 64 downstream paths. In the prior art bus arrangement, if there were 64 different paths on the bus 20, that would be the maximum number of signals that could be transmitted throughout the network. However, in the present invention, many more than 64 different signals can be transmitted along the network at any given time, because the 64 paths 106AB between the concentrators 100A and 100B may be carrying different signals from those carried by the 64 paths 106BC between the concentrators 100B and 100C, which again may be different from the signals carried along the 64 paths between the concentrators 100C and 100D along the 64 paths 106CD. Thus, the channel segmentation which is made possible by the switching matrices in the concentrators 100 of the present invention greatly increases the capacity of a given size of signal-carrying hardware over the prior art bus arrangement.

If the prior art hubs 10 of FIG. 3 were made so that they could segment the channels going along the bus 20, then, in accordance with the teachings of the prior art, which are that there must be an N×N crosspoint switch, with N being the number of paths into and out of the hub, each hub would have to include a much larger crosspoint switch, making it too expensive. For example, looking at the network in FIG. 3, if each hub 10 were made to handle 16 users and the bus 20 were made to carry 64 channels upstream and 64 channels downstream, then the crosspoint switch in the hubs 10 would have to be (16+64+64)×(16+64+64), or a crosspoint switch having 20,736 switch points. The preferred embodiment of the present invention, however, by defining upstream ports, downstream ports, and user ports and arranging a plurality of crosspoint switches to meet the necessary functionality of that arrangement, requires only eight boards, each having six 8×16 crosspoint switches to accomplish the same function, or 6144 switching points (a reduction in the number of switching points of approximately 70%). This will be described in more detail below.

Figure 7:
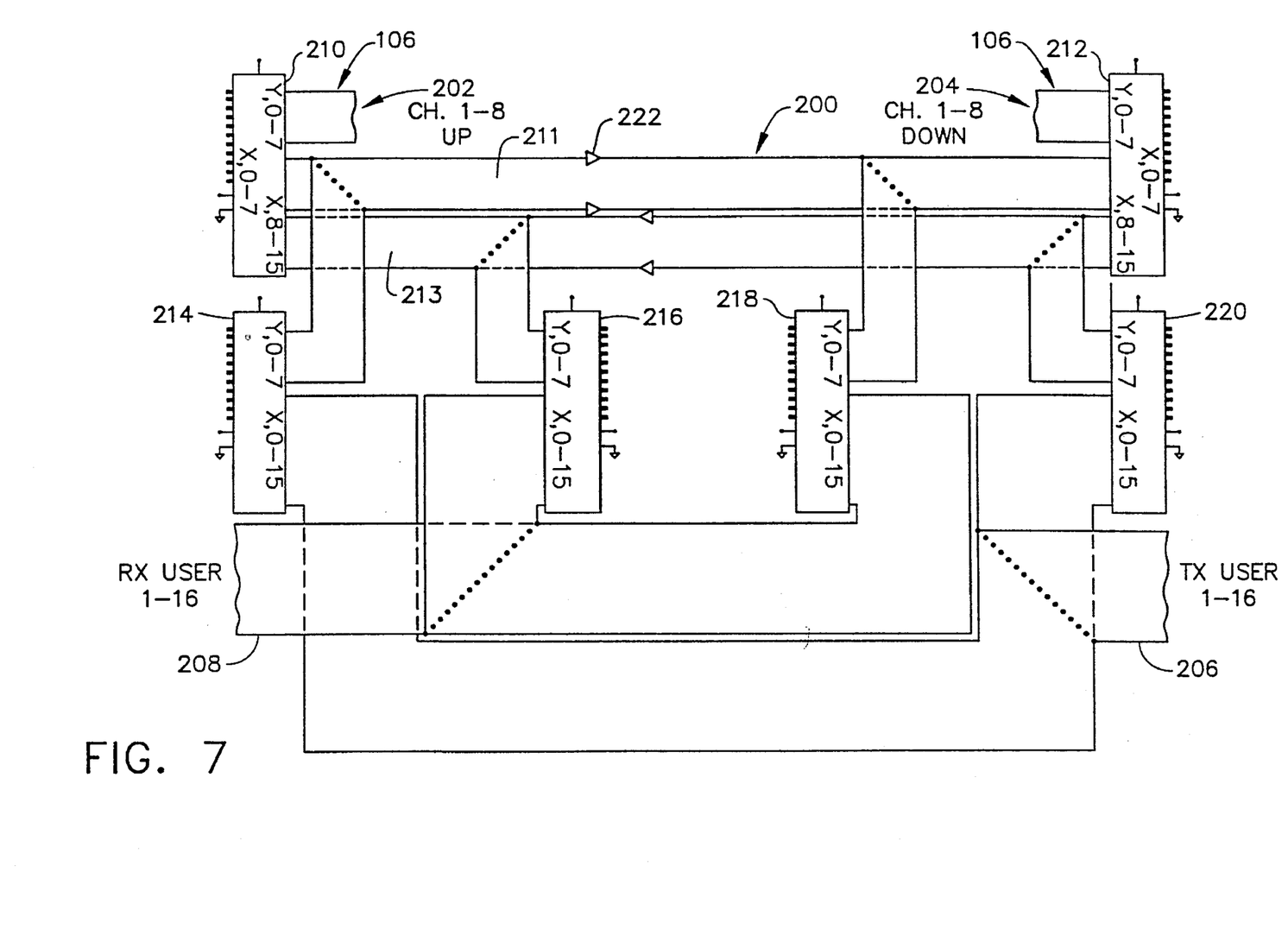
FIG. 7 is a schematic showing a preferred embodiment of the switching matrix of the present invention.

Each matrix box 100 in the preferred embodiment of the present invention includes a central processor and includes functions in addition to the switching functions described above, and those functions will be described in detail later. For now, we will look in more detail specifically at the switching function of the matrix boxes 100. In the preferred embodiment of the present invention, each matrix box 100 includes several of the switching matrices 200 shown in FIG. 7. The switching matrix 200 shown in FIG. 7 is configured to communicate with eight bi-directional upstream paths 202 (Channels 1–8), with eight bi-directional downstream paths 204 (Channels 1–8), with 16 user input paths 206 (TX Users 1-16), and with 16 user output paths 208 (RX User 1-16). The matrix 200 and all the paths are configured to be able to handle a video bandwidth (at least 4.5 MHz) and, in a preferred embodiment of the present invention, 8 MHz.

A preferred embodiment of the switching matrix 200, as shown in FIG. 7, includes six 8×16 crosspoint switches 210, 212, 214, 216, 218, 220. An example of a crosspoint switch which may be used is Harris model CD22M3494. Each crosspoint switch has eight Y coordinates and sixteen X coordinates as well as connecting pins for connecting to a central processor, which controls the switch. The upstream crosspoint switch 210 in the upper left corner of FIG. 7 has its Y coordinates connected to eight bi-directional upstream channels (corresponding to an internodal pathway 106), its first eight X coordinates (X0–X7) connected to eight left-to-right paths 211, and its second eight X coordinates (X8–X15) connected to eight right-to-left paths 213.

The downstream crosspoint switch 212 in the upper right corner of FIG. 7 similarly has its Y coordinates connected to eight bi-directional downstream paths 204 (corresponding to another internodal pathway 106). Its first eight X coordinates are connected to the eight left-to-right paths 211, and its second eight X coordinates are connected to the eight right-to-left paths 213. The direction of the sixteen paths between the upstream and downstream crosspoint switches 210, 212 is defined by a plurality of amplifier/buffers 222, such as Comlinear model CLC 414 or Linear Technology model LT 1230.

The first transmit crosspoint switch 214 has its Y coordinates connected to the eight left-to-right paths 211 between the upstream and downstream crosspoint switches 210, 212, and its X coordinates connected to the sixteen user inputs 206 (TX User 1-16). The user input signals are treated between the time they reach the concentrator box 100 and the time they get to the user input points 206, as will be described later.

The second transmit crosspoint switch 220 has its Y coordinates connected to the eight right-to-left paths 213 between the upstream and downstream switches 210, 212 and its X coordinates connected to the 16 user input points 206 (TX User 1-16).

The first receive crosspoint switch 216 has its Y coordinates connected to the eight right-to-left paths 213 and its X coordinates connected to the sixteen output points to the users 208 (RX User 1-16). Again, the signals going to the users will be treated between the time they leave the output points 208 and the time they get to the user output ports on the box 100, as will be described below.

The second receive crosspoint switch 218 has its Y coordinates connected to the eight left-to-right paths 211 and its X coordinates connected to the sixteen output points to the users 208 (RX User 1-16).

As was explained before, there are several switching possibilities for every signal coming into and leaving the matrix 200. Some examples are listed below:

1. A signal coming from a user and going to another user.

Let us assume that User 1 is sending a signal to the matrix 200. That signal arrives at the TX User 1 point, which is in communication with the XO pin of the first transmit switch 214 and with the XO pin of the second transmit switch 220. The signal can get to another user by passing through either of the transmit switches 214, 220. If it goes through the first transmit switch 214, it will end up on one of the left-to-right paths 211, will then go through the second receive crosspoint switch 218, and then to the selected user through that user's RX User point. If it goes through the second transmit switch 220, it will end up on one of the right-to-left paths 213, will go into the first receive switch 216, and then out to the selected user through that user's RX User point. If it is desired to send that signal to more than one user, then the appropriate receive switch 216 or 218 can connect a signal on a single left-to-right or right-to-left path with multiple RX User points.

2. A signal coming from a user and going to an upstream path.

Again, User 1 is sending a signal to the matrix box 100, and that signal is treated and then received at the TX User 1 point. In order for that signal to get onto an upstream path, it must pass through the second transmit switch 220, which puts the signal on a right-to-left path 213, where it enters one of the X8–X15 pins of the upstream switch 210 and leaves by one of the Y pins of that switch to an upstream channel on an internodal path 106. Of course, the upstream switch 210 could be commanded to send that same signal to more than one upstream channel, if desired, although that is not likely, since upstream paths are to be conserved. Also, the signal coming from User 1 could be going to an upstream path at the same time that it is going to another user as was described in #1 above.

3. A signal coming from a user and going to a downstream path.

The signal coming from User 1 would have to pass through the first transmit switch 214, so that it ends up on a left-to-right path 211. It then reaches one of the X0–X7 pins of the downstream switch 212 and leaves that switch 212 through one of the Y pins.

4. A signal coming from an upstream path and going to a user.

A signal coming from Channel 1 of the upstream path arrives at the upstream switch 210 through one of the Y pins and leaves through one of the X0–X7 pins onto a left-to-right path 211. It is then received by the second receive switch 218, where it enters through one of the Y pins of that switch. It then leaves that switch through one or more of the X pins to one or more of the users through the RX User points 208. Again, this signal can be received by one or more users at the same time that User 1's signal is going through the matrix 200. For example, User 1 may be receiving a signal from an upstream path at the same time that it is transmitting signals into the matrix, or User 2 may be receiving User 1's signal at the same time that User 3 is receiving an upstream signal. However, the software will prevent user 2 from receiving signals from two different sources at once.

5. A signal coming from an upstream path and going to a downstream path.

Taking the same channel 1 input to the upstream switch 210, it will again leave the upstream switch 210 through one of the first eight X pins (X0–X7), will get on one of the left-to-right paths 211, and will enter the downstream switch 212 through one of its first eight X pins (X0–X7), and will leave through one of the Y pins of the downstream switch 212 to one of the downstream channels 204. It may leave through pin Y0 as Channel 1, or it may leave through another pin as another channel. Again, this shows how channel segmentation can work to increase the capacity of the system. A signal coming into the matrix 200 as Channel 1 may leave as some other channel, freeing up the Channel 1 path in the downstream portion of the network for some other purpose.

6. A signal coming from a downstream path and going to a user.

A signal comes from Channel 5 of the downstream path and enters the downstream switch 212 through the pin Y4. It leaves the downstream switch 212 through one of the last eight X pins (X8–15) and gets onto a right-to-left path 213. It is received by the first receive switch 216 and is then transmitted to one or more of the users by leaving one or more of the X pins of the receive switch 216 to the appropriate user point(s) 208.

7. A signal coming from a downstream path and going to an upstream path.

A signal comes from Channel 5 of the downstream path and enters the downstream switch 212 through the pin Y4. As in the previous example, it leaves the downstream switch 212 through one of the pins (X8–15) and gets onto a right-to-left path 213. It is received by the upstream switch 210 at one of the pins (X8–15) and leaves through one of the Y pins.

Figure 7A:
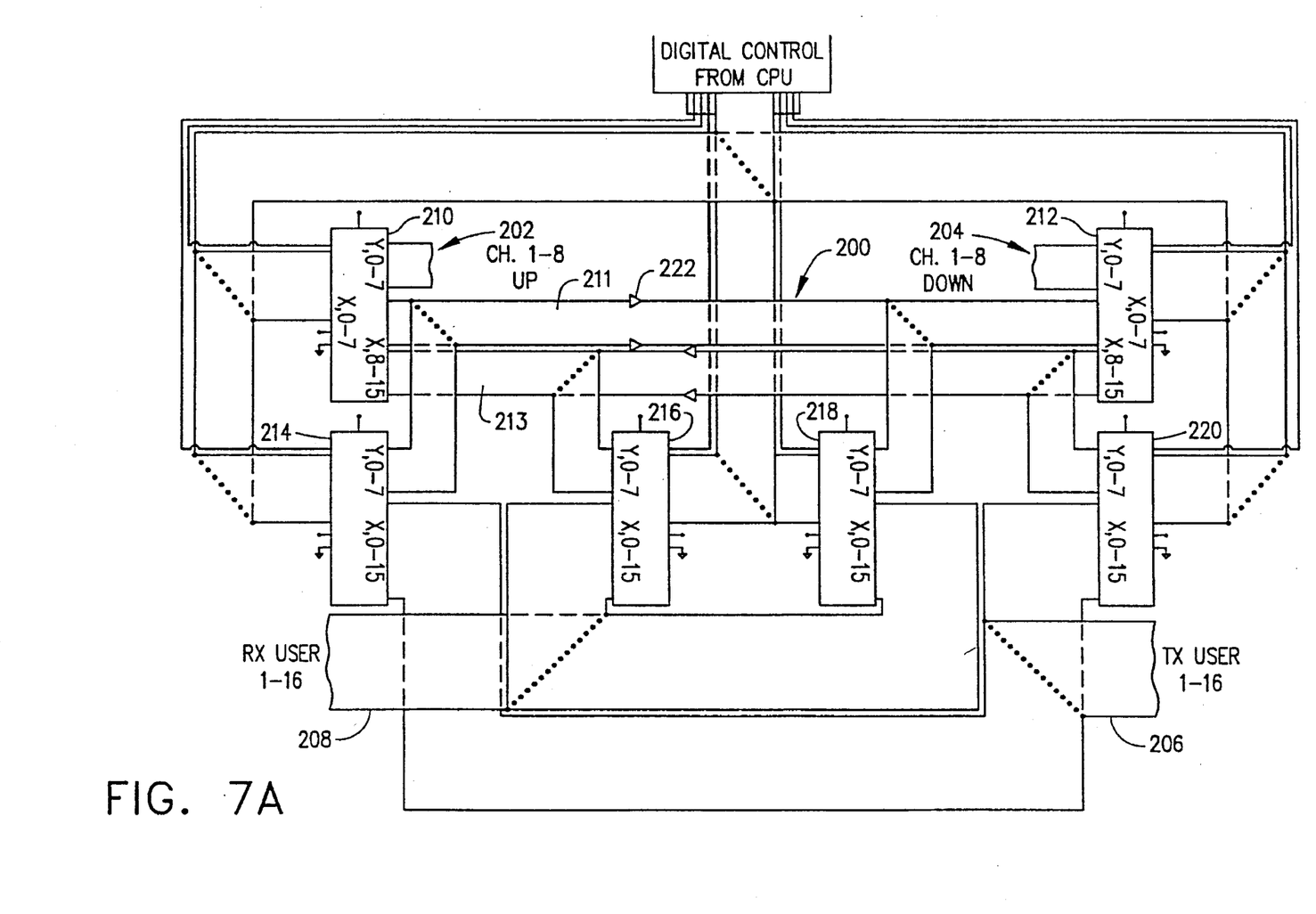
FIG. 7A is the same schematic as FIG. 7 but with the central processor (CPU) shown with its connections to the switches in the matrix.

FIG. 7A shows the same matrix 200 as does FIG. 7, but it also shows the central processor and its digital control connections to the analog crosspoint switches in the matrix 200.

Figure 8:
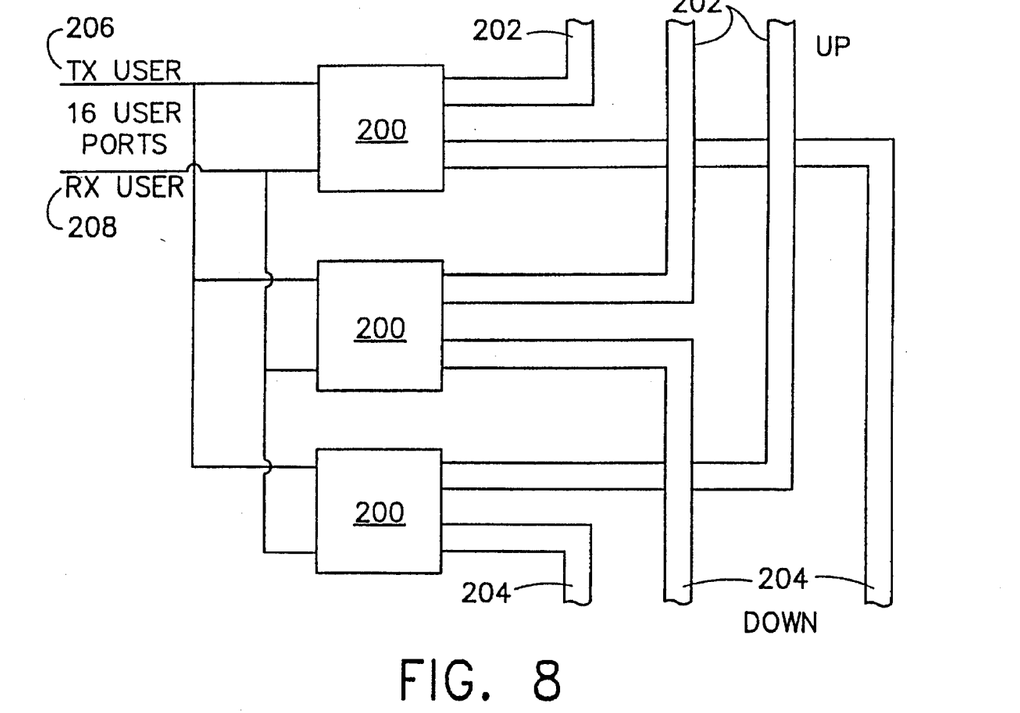
FIG. 8 is a schematic showing how the switching matrices of FIG. 7 can be interconnected to add more upstream and downstream channels.

In the matrix box or concentrator 100 are a plurality of these matrices 200, interconnected as shown in FIG. 8. The same TX User points 206 communicate with all the matrices 200 in the box 100, and the same RX User points 208 communicate with all the matrices 200 in the box 100. Each matrix 200 connects to eight different up channels 202 (creating part of an internodal path 106 which will go to another matrix box) and to eight different down channels 204 (creating part of another internodal path 106 to a different box), so that, by stacking the matrices 200, the box 100 can handle more channels. In one of the preferred embodiments, there are eight of these matrices 200 stacked to permit communication with 64 upstream channels 202 and 64 downstream channels 204.

In the preferred embodiment, analog video signals are switched on one set of matrices 200, and analog audio signals are switched on a different set of matrices 200, so, for simultaneous, bi-directional transmission of audio and video among 16 users and 64 channels, there are eight interconnected matrices 200 for the video signals and eight interconnected matrices 200 for the audio signals in a single box 100. All the matrices 200 in a single box 100 are controlled by the central processor for that box 100.

Looking at FIG. 4 again, between every user 102 or source 120 and the network is a user interface (part of 102). In the preferred embodiment, signals travel along the internodal paths 106 in common mode. Signals travel from the concentrator box 100 to users 102 along the pathways designated as 104, which are preferably twisted pair cable. It is also possible for signals to travel directly from one user interface 102 to another user interface 102 over twisted pair cable. In the present invention, when signals are sent over twisted pair wiring, they are sent in differential mode, so the user interfaces 102 and the matrix boxes 100 convert outgoing signals from common mode to differential mode before sending the signals out over twisted pair wiring and convert signals from differential mode to common mode when receiving signals from twisted pair wiring.

It is anticipated that the wiring 104 (referring to FIG. 4) between the user interface 102 and the concentrator box 100 would include four twisted pairs of wire, preferably terminating in an RJ45 connector with eight pins. In the preferred embodiment, pins 1 and 2 transmit audio with control data piggybacked on the analog audio signal, pins 4 and 5 transmit video, pins 3 and 6 receive audio with control data piggybacked on the analog audio signal, and pins 7 and 8 receive video. Thus, in this way, simultaneous, bi-directional, real-time audio, video, and data signals can be carried in one eight-wire twisted pair cable. In the preferred embodiment, the internodal pathways 106 with 64 bi-directional common mode audio and video channel transmission capability are made up of 128 cables.

Figure 11:
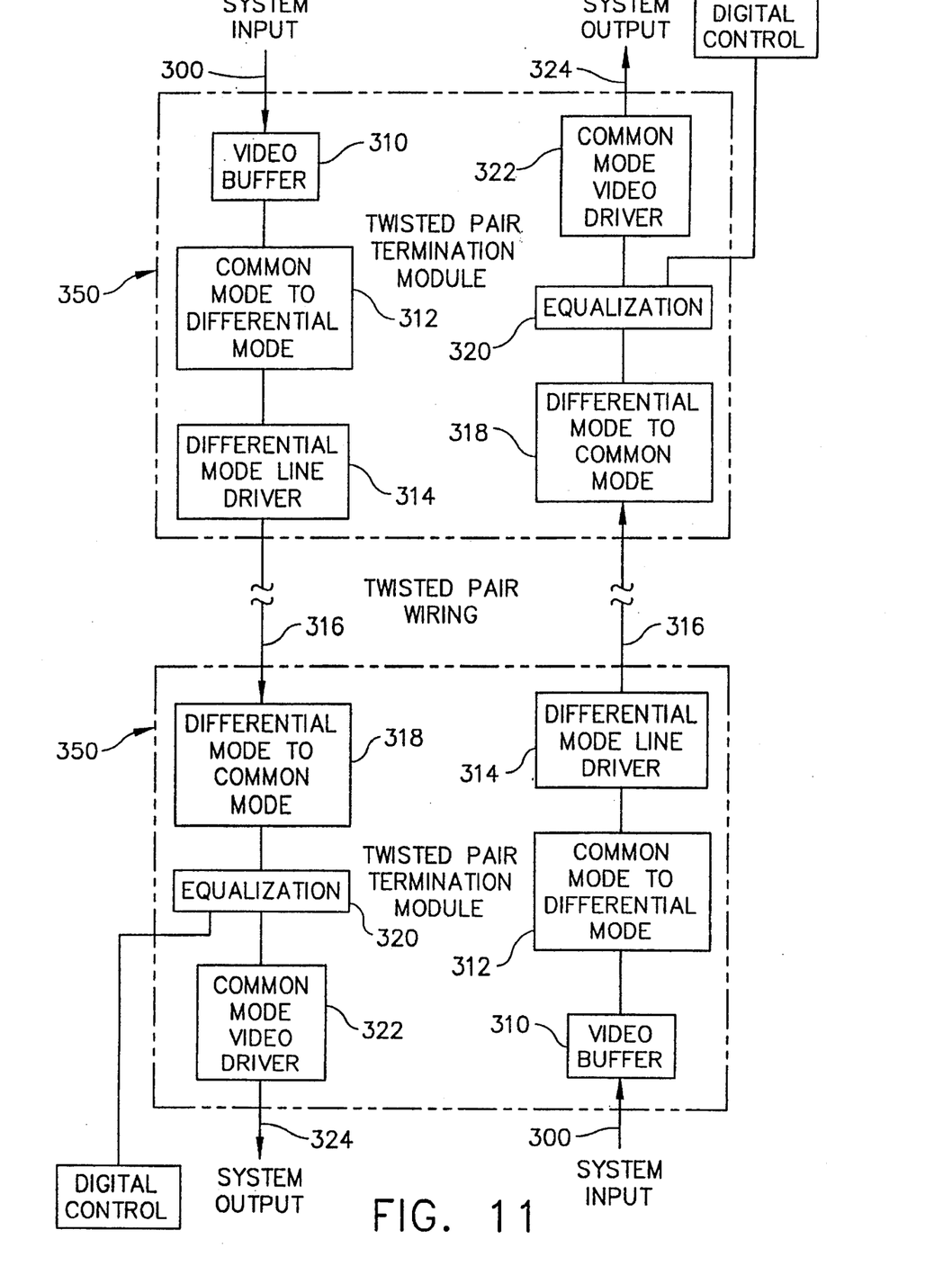
FIG. 11 is a schematic showing the preferred embodiment of how a signal travels in the network of the present invention from one twisted pair termination module to another over twisted pair wiring.

For ease of explanation, we will refer to the portions of the user interface boxes 102 and of the matrix boxes 100 which take care of this signal conversion as twisted pair termination modules 350. It would also be possible for these termination modules 350 to function independently, outside of the boxes 100, 102, as required. FIG. 11 shows two twisted pair termination modules 350 and the manner in which they handle signals.

Figure 9:
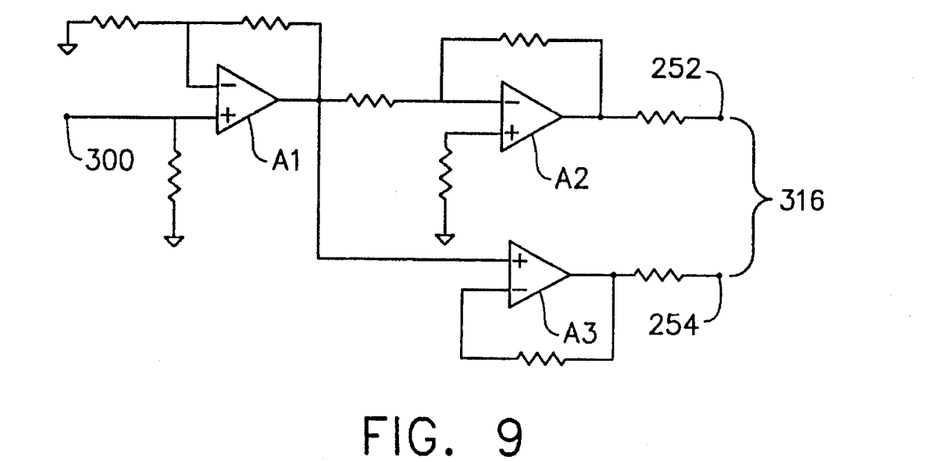
FIG. 9 is a schematic of the circuitry a signal passes through as it leaves the concentrator of FIG. 4 over twisted pair wiring.

Signal coming in from external device:

Referring now to FIG. 11, there are two twisted pair termination modules 350 connected together by twisted pair wiring 316. At the top left portion of the upper twisted pair termination module 350 is a system input 300. This is an input in common mode (for example, a standard single-ended NTSC signal). It may be coming from a video camera, a cable television channel, a microphone, or another source. The signal goes through a video buffer 310, is converted to differential mode by a converter 312, goes through a differential mode line driver 314, which is an operational amplifier, and then out over the twisted pair wiring 316. The circuitry which performs these functions is shown in FIG. 9 and is described later.

Figure 10:
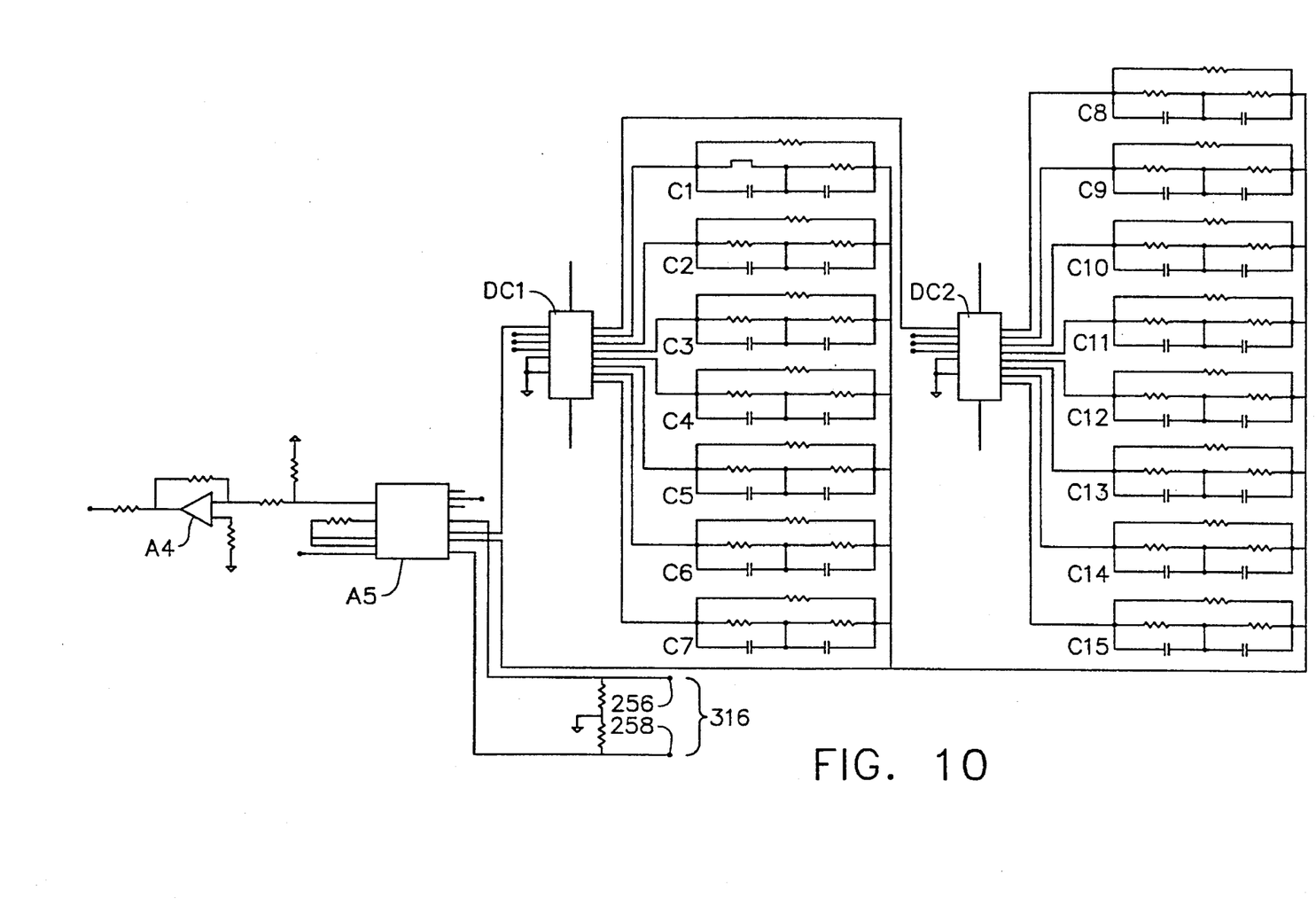
FIG. 10 is schematic of the circuitry a signal passes through as it arrives at the concentrator of FIG. 4 over twisted pair wiring.

Signal coming in from twisted pair wiring:

Following that twisted pair wiring 316 to the left side of the lower twisted pair termination module 350, we see the process that occurs when a differential signal is received at that module 350. First, the signal is converted from differential mode to common mode at a converter 318. It goes through an equalization circuit 320 to compensate for signal degradation, it goes through a common mode video driver 322, and then out to an external output 324. The circuitry which performs these functions is shown in FIG. 10 and is described later.

Because of the equalization circuit 320, it is possible to have simultaneous, bi-directional signals passing through two twisted pairs in the same cable. The present invention has overcome the problems of signal degradation and crosstalk that plagued prior art devices.

The right-hand side of FIG. 11 is the same as the left-hand side but reversed. Looking at the lower right hand corner of the lower twisted pair termination module 350, there is again a system input 300, which goes through a video buffer 310, through a converter 312 which converts the signal from common mode to differential mode, through a differential mode line driver 314, and out over the twisted pair wiring 316. When the differential signal is received over the twisted pair wiring 316 on the right side of the upper module 350, it is converted from differential mode to common mode at the converter 318, the signal is equalized 320, and the signal passes through a common mode driver 322 to an output 324, which may be a video monitor, a speaker, and so forth. It can be seen in FIG. 11 that the equalization circuits are digitally controlled. This control would preferably come from the central processor in the box in which the circuitry is located.

FIG. 9 shows the circuit that is used for signals which come in in common mode and go out in differential mode over twisted pair wiring. It functions as follows: The signal enters at the port 300 (corresponding to the system input 300 in FIG. 11), and passes through the operational amplifier A1, which provides signal level and impedance matching with the external system. The second operational amplifier A2 is wired as an inverter and generates the negative component of the differential signal, while driving the line through an impedance matching resistor. The third operational amplifier A3 is wired as a non-inverting driver, and generates the positive component of the differential signal, while driving the line through an impedance matching resistor. The negative component of the differential signal leaves at the point 252 onto one of the twisted pair wires 316, and the positive component of the differential signal leaves at the point 254 onto the other of the twisted pair wires 316. FIG. 10 shows the circuit that is used for signals coming into the twisted pair termination module 350 as differential signals over twisted pair wiring 316 and leave in common mode. It functions as follows: The differential signal arrives on two twisted pair wires 316 at the points 256, 258. The operational amplifier A5 provides impedance matching with the input resistors, signal level matching, amplitude/frequency compensation (equalization), and conversion of the differential signal to a common mode signal. The cells C1 to C15 are composed of passive circuits and are used by the A5 amplifier to provide amplitude/frequency compensation (equalization). Each cell is tuned to a specific length of twisted pair wire. The central processor knows the length of the twisted pair wire 316 coming to the points 256, 258 and digitally controls the analog multiplexers DC1 and DC2, which pilot the cells C1 to C16 to provide the proper compensation for that length. Amplifier A4 is the output driver, which interfaces with the external system.

Figure 12:
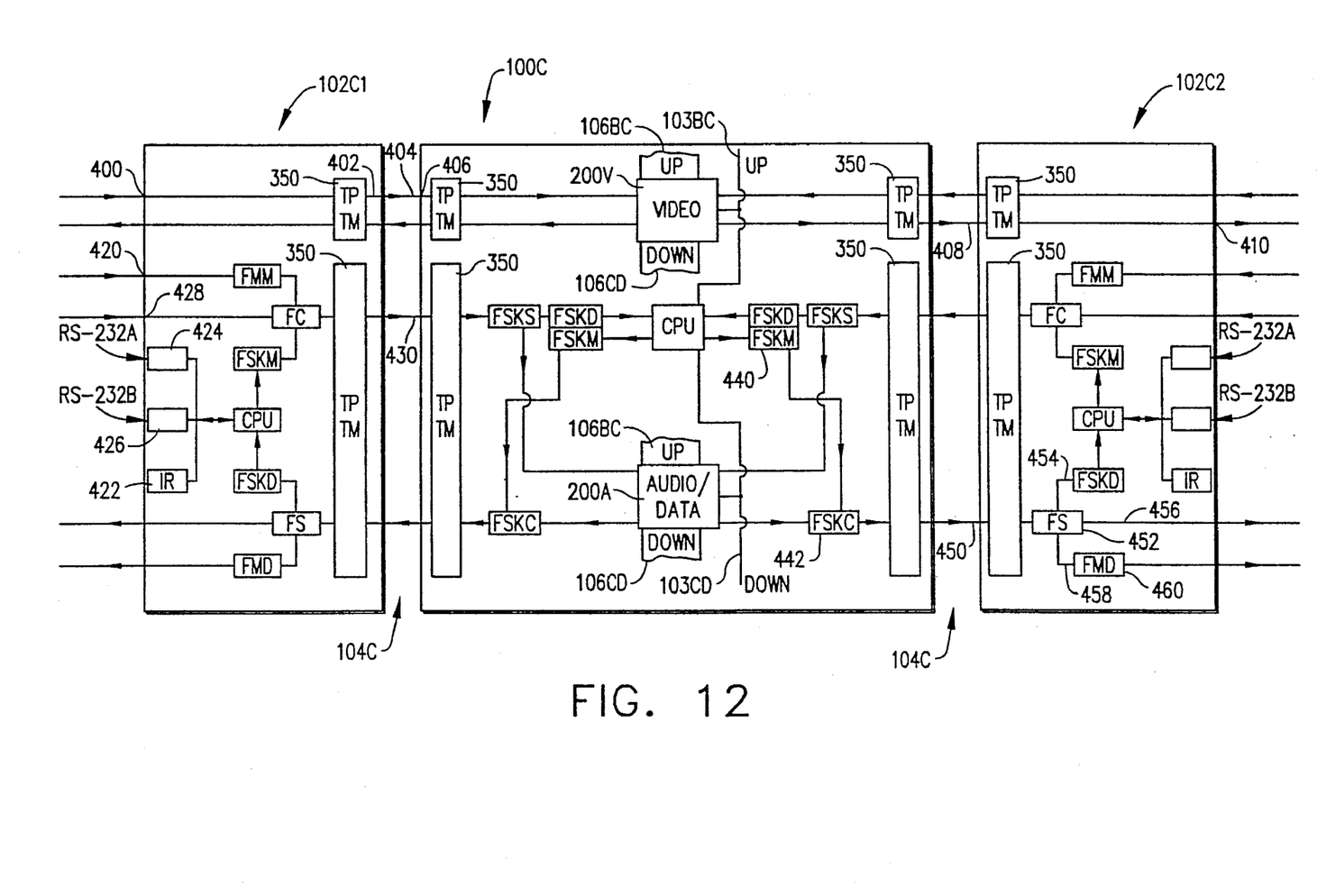
FIG. 12 is a schematic showing the flow of video, audio and data signals from a user interface, through a concentrator (including the switching matrix), to another user interface.

FIG. 12 is a schematic view which helps clarify how the twisted pair termination modules 350 function in the user interfaces 102 and the matrix boxes 100 and how audio, video, and data signals travel throughout the network of FIG. 4. To help see what is upstream and what is downstream, the matrix box or concentrator in FIG. 12 is labelled as box 100C, the upstream channels are in the path 106BC, going to the concentrator 100B, and the downstream channels are in the path 106CD, going to the concentrator 100D. Two users 102C1 and 102C2 are shown, each connected by two pairs of twisted pair wiring to the concentrator 100C. Of course, every one of the users 102C connected to the concentrator 100C would have a similar connection.

Transmission of video signal through the network:

Let's look first at the upper left-hand portion of the user interface 102C1, where there is video input to the user interface 102C1 at the point 400. This video input is in common mode. It may be coming from a video camera, cable television, or a video recorder, for example, over coaxial cable. The analog video signal is routed through a twisted pair termination device 350, which has been described with reference to FIGS. 9, 10, and 11. The video signal then leaves the termination device 350 at the point 402 as a differential signal. It travels over the twisted pair 404 and is received at a user input port 406 of the concentrator 100C, where it is routed through another twisted pair termination device 350, which converts the signal to common mode and equalizes the signal. The video signal then arrives at a TX User point at the matrix 200V, which is the same as the matrix 200 which was described with respect to FIG. 7. The video signal is switched through the matrix 200V, with the central processor of the box 100C closing switch points in the crosspoint switches as needed to route the signal in the correct direction. If the signal is going to an upstream channel 106BC, no further signal treatment is done, and the signal leaves the box 100C via one of the upstream channel ports. Similarly, if the signal is going to a downstream channel 106CD, no further signal treatment is done, and the signal leaves the box 100C via one of the downstream channel ports. If the signal is to go to another user connected to the box 100C, such as user 102C2, shown on the right of the concentrator 100C, then the signal leaves the matrix 200V through the appropriate RX User point and passes through another twisted pair termination module 350, where it is converted to differential mode and sent out over the twisted pair 408. The signal is received at the user interface 102C2, goes through another twisted pair termination module 350, where it is converted back to common mode, is equalized, and leaves the user interface 102C2 through the port 410 to a video recorder, video monitor, or other device for receiving video signals.

Transmission of audio and data signals through the network:

Looking again at the left-hand side of the first user interface 102C1 in FIG. 12, an analog audio signal enters the user interface at the port 420. This would actually be two audio signals, left and right stereo, coming in from a video camera with sound, an audio or video tape recorder, or other audio source in common mode. Also, data may be input to the user interface 102C1 at four different points. System control data in the form of infrared remote control signals can enter through the IR window 422. Other digital control data, such as mouse or keyboard commands, can be input via the ports 424 or 426. It is also possible to input external carrier frequencies through the port 428.

The left and right audio signals coming in at the port 420 are frequency multiplexed at the frequency multiplexer (FMM). System control data coming in through ports 422, 424, or 426 is first routed through the central processor for the user interface (CPU) and then, in the form of a digital signal to the frequency shift key modulator (FSK M), which sends it on to the frequency coupler (FC). The frequency coupler couples the multiplexed audio signal with the data signal, piggybacking the data onto the analog audio signal. If a signal has come in through the external carrier frequency port 428, that signal goes directly to the frequency coupler (FC), where it is coupled together with the audio and control data. This common mode audio/data signal then goes into a twisted pair termination module 350, where it leaves over the twisted pair 430 in differential mode and arrives at the concentrator 100C. It goes through another twisted pair termination module 350, where it is converted to common mode. This combined audio/data signal then goes through a frequency shift key separator (FSK S), where the system control data (which came into the user interface 102C1 through the ports 422, 424, or 426 is stripped off as a digital signal and routed to the central processor (CPU) of the concentrator 100C, which controls the audio and video matrices 200A and 200V in the concentrator box 100C. The multiplexed audio/external carrier frequency signal passes through the audio matrix 200A and can go to up channels via the internodal path 106BC, to down channels through the internodal path 106CD, or to users 102C connected to the same box 100C by going to the frequency shift key coupler (FSK C) 442.

The central processor (CPU) acts on the digital control signal it receives from the frequency shift key demodulator (FSK D) and on any digital signals it receives from upstream and downstream digital links 103. If the control signal is a routing signal, for example, indicating that the user at 102C1 wants to set up communication with the user at 102C2 and with upstream users and downstream users, the CPU controls the necessary video and audio matrix switches in its own box 100C to set up those routes. It will also send signals to the CPUs of upstream matrix boxes (such as 100 A and B) and downstream matrix boxes (such as 100 D and E) via the appropriate digital links 103 in order to cause those CPUs to close the appropriate switches in their matrix boxes 100 for routing to more distant users. If the CPU at the box 100C receives a digital control signal from another user 102C or from an upstream or downstream box via the data link 103, or if the CPU at the box 100C generates its own signal which should be passed on to a user 102C at the box 100C (such as a signal to control the user interface 102C2 or the video camera connected to user interface 102C2), it will send the control signal or signals through a frequency shift key modulator 440 (FSK M), which sends the information on to the frequency shift key Coupler (FSK C) 442, where the information signal component is multiplexed with the signals leaving the audio matrix 200A toward the user interface 102C2. It is clear from the foregoing description that the control data does not travel through the matrix with the audio signals and the external carrier frequencies. This allows isolating the system control data signal on its arrival at the concentrator 100C. The original signal is read, its instructions are carried out, and that signal is terminated. The CPU then reformats the signal or generates its own signal and, if necessary, forwards the outgoing control signal in the appropriate direction. The combined audio/data signal leaving the frequency shift key coupler 442 again goes through a twisted pair termination module 350, leaves the concentrator box 100C via an output port, over the twisted pair 450 to the user interface 102C2, where the analog audio/data signal goes through the receiving side of another twisted pair termination module 350, on to a frequency separator (FS) 452, which separates out the control signal onto the path 454, separates out the external carrier frequency onto the path 456, and sends the multiplexed audio signal out onto the path 458. The external carrier frequency leaves the user interface 102C2 with no further signal treatment. The multiplexed audio signal is demultiplexed by the frequency modulation demodulator 460 and leaves as separate left and right audio signals. The control data on the path 454 then passes through a frequency shift key demodulator (FSK D) which puts it back into digital form and then to the CPu for the user interface 102C2. The CPU then sends any control signals which need to go out to a device via one of the digital input/output ports RS-232A, RS-232B, or the infrared window IR.

It will be clear from the above description that this is a bi-directional network, so, for example, the second user interface 102C2 can send signals out in the same way the first user interface 102C1 did, and the first user interface 102C1 can receive signals in the same way that the second user interface 102C2 did. Similarly, signals may come into the matrix box 100C from upstream and downstream in the same manner that they leave.

Figure 13:
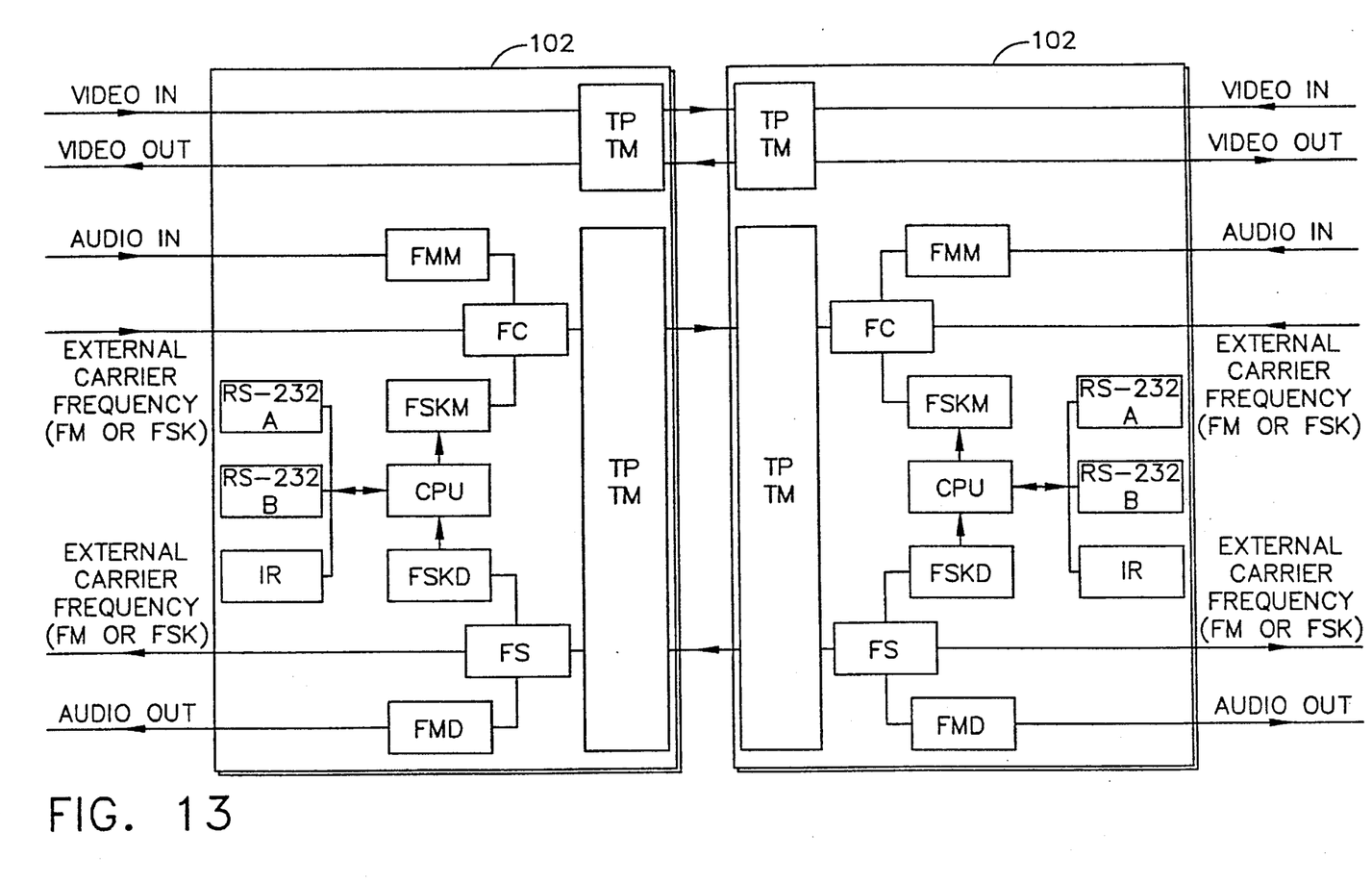
FIG. 13 is a schematic showing the flow of video, audio, and data signals directly from user interface to user interface.

FIG. 13 shows a direct connection between user interfaces 102. These user interfaces 102 stand alone and are not connected to any concentrator. Since this is simply a point-to-point transmission, no switching is required. In this case, the video signal is converted from common mode to differential mode to go over the twisted pair wiring between the user interfaces 102 and then back to common mode upon reception. The audio signals are multiplexed and combined with the data signals. The combined audio/data signal is converted to differential mode for transmission over twisted pair. Upon reception over twisted pair, the combined audio/data signal is converted back to common mode, the data is separated out, and the audio is demultiplexed.

While preferred modes of signal transmission have been shown throughout the foregoing description, it will be clear that other transmission modes could be used.

It will be clear to those skilled in the art that modifications may be made to the preferred embodiment described above without departing from the scope of the present invention.

What is claimed is:

1. A device for the simultaneous, bi-directional transmission of video bandwidth signals, comprising:

a plurality of user ports;

a plurality of channel up ports;

a plurality of channel down ports; and a switching matrix, comprising a plurality of switching points; and wherein said switching matrix permits the simultaneous, bi-directional transmission of video bandwidth signals between users, between users and up channels, and between users and down channels.

2. A device made in accordance with claim 6, and further including a circuit for equalizing signals upon receipt and before introducing the signals to the switching matrix.

3. A network, including a user interface for every user and at least one device as recited in claim 2, wherein each user interface also includes a circuit for equalizing signals upon receipt of the signals at the user interface from the device.

4. A network, as recited in claim 3, and further comprising circuitry to convert signals from common mode to differential mode before sending them out of the device over twisted pair wiring.

5. A device as recited in claim 1, wherein the number of switching points is fewer than half of N×N, where N equals the number of user ports plus the number of channel up ports; plus the number of channel down ports.

6. A device for the simultaneous, bi-directional transmission of video bandwidth signals in the local area network environment, comprising:

a plurality of user ports;

a plurality of channel up ports;

a plurality of channel down ports;

a switching matrix, comprising:

a plurality of interconnected NC×NU cross-point switches, where NC is the number of channel up ports and NU is the number of user ports; and a plurality of buffers which define the direction of transmission between the cross-point switches;

wherein said switching matrix permits the simultaneous, bi-directional transmission of video bandwidth signals between users, between users and up channels, and between users and down channels.

* * * * *